(12) United States Patent
Bassov et al.

(10) Patent No.: US 9,916,102 B1
(45) Date of Patent: Mar. 13, 2018

(54) MANAGING DATA STORAGE RESERVATIONS ON A PER-FAMILY BASIS

(71) Applicant: EMC Corporation, Hopkinton, MA (US)

(72) Inventors: Ivan Bassov, Brookline, MA (US); Walter C. Forrester, Berkeley Heights, NJ (US); Michal Marko, Fanwood, NJ (US); Ahsan Rashid, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/197,064

(22) Filed: Jun. 29, 2016

(51) Int. Cl.
*G06F 12/08* (2016.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0653* (2013.01); *G06F 3/0665* (2013.01)

(58) Field of Classification Search
None
See application file for complete search history.

(56) References Cited

U.S. PATENT DOCUMENTS 9,330,155 B1 * 5/2016 Bono ................ G06F 17/30176

\* cited by examiner

*Primary Examiner* — Yong Choe
(74) *Attorney, Agent, or Firm* — BainwoodHuang (57) ABSTRACT

A technique for managing storage space in a data storage system generates liability values on a per-family basis, with each family including files in the file system that are related to one another by snapping. Each family thus groups together files in the file system that share at least some blocks among one another based on snapshot activities. Distinct files that do not share blocks based on snapping are provided in separate families. The file system leverages the snap-based relationships among family members to produce more accurate estimates of liability than would otherwise be feasible.

20 Claims, 4 Drawing Sheets

MANAGING DATA STORAGE RESERVATIONS ON A PER-FAMILY BASIS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Some data storage systems employ a liability/insurance model to track available storage space. For example, when a file system built upon a pool of storage resources initiates an action that would change the amount of storage space required from the pool, the file system calculates a "liability." The liability identifies an estimate of the amount of storage space required from the pool to complete the action. If the storage pool has enough available storage space to cover the liability, then the pool may issue "insurance" against the liability, e.g., by increasing the amount of reserved space in the pool by the specified amount of liability. The file system may then proceed to perform the initiated action, as the storage space required to complete the action has been fully insured.

SUMMARY

According to the above-described prior approach, a data storage system determines liability for file systems on a per-file-system basis. Such file systems each typically include a single file that stores a production version of a data object and multiple other files that store snaps of the production file. As is known, a "snap" is a point-in-time version of a file that initially shares all blocks with the file from which it is snapped. A "block" is a unit of storage space that a file system may allocate. Each data object stored by a file typically implements a host-accessible LUN (Logical UNit) or file system, for example. Thus, the files stored in such file systems may themselves store, within their file data, implementations of entire LUNs and/or file systems.

Determining liability at per-file-system granularity works well when each file system is limited to a single production object and its snaps. Unfortunately, however, the prior approach is less well-suited for determining liability for file systems that include multiple production objects (implemented in files) and their respective snaps. Determining liability per file system in such situations becomes a complicated task, with file systems running the risk of vastly overestimating the amount of liability required to perform routine actions. The prior approach can therefore result in poor storage utilization, with file systems reserving much more space than is needed to accommodate their data objects, effectively displacing storage space that could be used for other objects if estimates of liability could be made more accurately.

In contrast with the prior approach, an improved technique for managing storage space in a data storage system generates liability values on a per-family basis, rather than on a per-file system basis, with each "family" including files in the file system that are related to one another by snapping. Each family thus groups together files in the file system that potentially share at least some blocks among one another based on snapshot activities. Distinct files that do not share blocks based on snapping are provided in separate families. The file system leverages the snap-based relationships among family members to produce more accurate estimates of liability than would otherwise be feasible.

Advantageously, a data storage system that employs the improved technique can often store more host data than it could if it used the prior approach, without violating space guarantees. Data storage systems can thus be utilized more efficiently, avoiding the need for larger and more expensive systems to accommodate the same amounts of data, and further avoiding associated additional rack space, cooling, and maintenance costs.

Using the prior technique, it was sometimes necessary to invalidate snaps of a production object in order to meet space guarantees for the production object. In some examples, the improved technique hereof generates liability values that account for storage space used by snaps, and therefore avoids the need to invalidate snaps to meet space guarantees of production objects.

Using the prior technique, a file system was often limited to a single "thick" object, i.e., an object having a predetermined maximum size that was fully space-guaranteed. In some examples, the improved technique hereof generates liability for thick objects on a per-family basis and thus enables full reservations for a thick object in each family. In further examples, the improved technique hereof generates liability for any number of thick objects in a family.

In some examples, the families may include files that provide implementations of virtual machine disks, such as VVols (Virtual Volumes, available for VMWare, Inc., of Palo Alto, Calif.). However, families may include files that implement any type or types of data object, including, for example, LUNs, file systems, and/or ordinary files.

Certain embodiments are directed to a method of managing storage space in a data storage system. The method includes storing, in a file system built upon a pool of storage resources, multiple version families, each version family including a respective set of files that are related to one another by file snapping but that have no block-sharing relationships induced by file snapping with files in other version families. In response to receiving a command to perform an action that would affect storage requirements of one or more files in a version family, the method further includes generating a family liability value, the family liability value providing an estimate of storage space that would be required for that version family if the action were performed. The method further includes conducting an insurance-requesting operation, the insurance-requesting operation configured to (i) grant insurance to the version family when the pool has enough available storage space to guarantee the family liability value and (ii) deny insurance to the version family when the pool does not have enough available storage space to guarantee the family liability value. The method still further includes executing the command to perform the action based at least in part on the insurance-requesting operation granting the insurance to the version family.

Other embodiments are directed to a data storage system constructed and arranged to perform a method of managing storage space, such as the method described above. Still other embodiments are directed to a computer program product. The computer program product stores instructions which, when executed on control circuitry of a data storage system, cause the data storage system to perform a method of managing storage space, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing storage space in a data storage system generates liability values on a per-family basis, with each family including files in the file system that are related to one another by snapping. The file system thus leverages the snap-based relationships among family members to produce more accurate estimates of liability than would otherwise be feasible.

Figure 1:
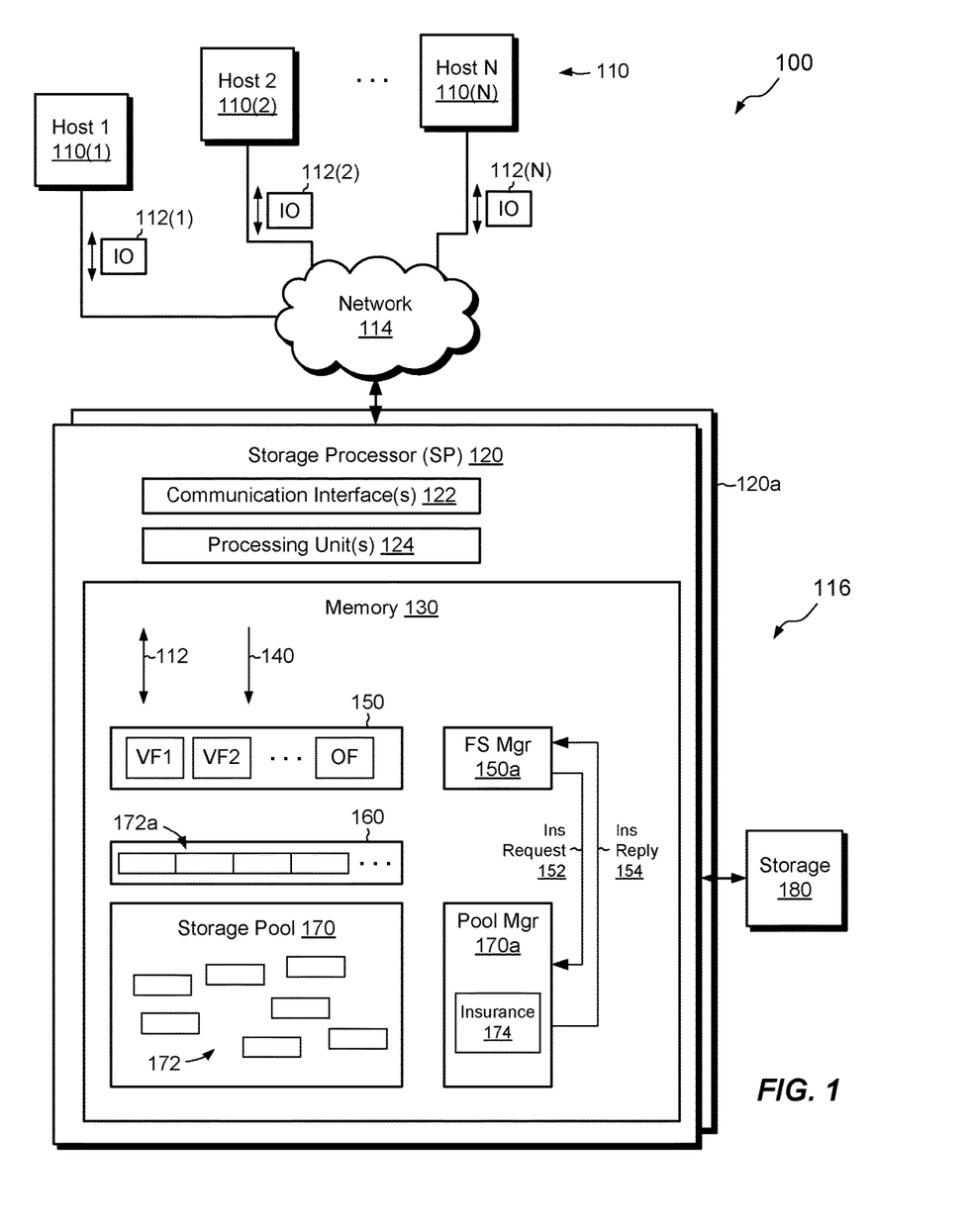
FIG. 1 is a block diagram of an example environment in which embodiments of the improved technique hereof can be practiced.

FIG. 1 shows an example environment 100 in which embodiments of the improved technique hereof can be practiced. Here, multiple host computing devices 110 ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

In an example, the storage 180 includes multiple disk drives, such as magnetic disk drives, electronic flash drives, solid state drives, optical drives, and/or other types of drives. Such disk drives may be arranged in RAID (Redundant Array of Independent/Inexpensive Disks) groups, for example, or any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a file system 150, a file system manager 150a, a sparse volume 160, a storage pool 170, and a pool manager 170a. The file system manager 150a manages operations of the file system 150 and the pool manager 170a manages operations of the storage pool 170a. Although a single file system 150 is shown, the data storage system 116 may include multiple file systems all sharing the same storage pool 170. Also, the data storage system 116 may include multiple storage pools, with each pool supporting its own respective file systems. The example shown is simplified and intended to be merely illustrative.

The storage pool 170 consumes the storage 180 (e.g., disk drives, solid state drives, etc.) and renders portions thereof in the form of extents 172. In a non-limiting example, extents 172 are fixed-size increments of storage, such as 256 MB or 1 GB in size, which provide storage units that may be provisioned within the data storage system 116.

The pool manager 170a manages the provisioning of extents 172 from the pool 170 and performs accounting to manage insurance 174. For example, pool manager 170a maintains a balance of reservations on storage extents 172 needed to cover all liability of any and all consumers of the storage pool 170, to ensure that space guarantees are maintained. In an example, the pool manager 170a requires total insurance 174 always to meet or exceed total liability.

The file system 150 is built upon the sparse volume 160. In an example, each file system in the data storage system 116 has its own respective sparse volume. Provisioned extents 172a have been provisioned from the storage pool 170 to satisfy storage requirements of file system 150. As the file system 150 grows and requires additional storage space, the file system 150 requests one or more additional extents 172 from the storage pool 170. Not all data objects in the file system 150 are necessarily fully space-guaranteed. Thus, there may be times when the file system 150 requests extents 172 for non-guaranteed objects but none are available without violating existing space guarantees.

As further shown in FIG. 1, the file system 150 includes multiple version families, VF1, VF2, etc., as well as an overhead family, OF. Each version family includes one or more files, which, where multiple files are provided, relate to one another by snapping. In some examples, one file in a version family may be a production file and the other files in that version family may be snaps (point-in-time versions) of that production file. In other examples, a version family may include multiple production files that each may have initially been snaps of some original file, which may or may not still be present. As the files in each version family are related by snapping, each of the files in a version family generally has block-sharing relationships with each of the other files in that version family. For example, each file in a version family typically shares at least one block (and often many blocks) with each of the other files in that version family. Version families generally do not share blocks with one another, however. Thus, a file in one version family has no block-sharing relationship with a file in any another version family.

In an example, the files within each version family provide file-based realizations of host-accessible data objects, such as LUNs, files systems, VVols, and/or other types of virtual machine disks, for example. Mapping (not shown) within the memory 130 translates the data in these files to corresponding data objects, which are then made accessible to hosts 110.

As is known, 'snapping' is a process whereby a file system creates a point-in-time version (snap) of a file by allocating a new inode (file-specific metadata structure) for the snap and copying attributes from the file's inode to the snap's inode. The copied attributes include one or more pointers to an indirect block tree of the file, which points to and arranges data blocks that store file data of the file. Creating a snap therefore allocates new metadata (the new inode) but no new data blocks. Rather, all data blocks of the file are initially shared with the snap. Over time, as the file evolves, write splits occur in which new data blocks are allocated to the file at written-to locations. The file's indirect block tree is updated to point to the newly-allocated blocks, with new indirect blocks allocated as needed. However, the snap's data blocks and indirect block tree remain unchanged. A consequence of a write split is that a data block of the file, which was previously shared with a snap, becomes "unique" (unshared). The block may become shared again later when another snap is taken, but such sharing will be between the file and the new snap, not with the previous snap.

Unlike the version families (e.g., VF1, VF2, etc.), the overhead family, OF, typically does not include files or snaps but rather metadata structures that are common to many or all version families. These may include, for example, inodes, per-block metadata, virtual block maps, metadata of the sparse volume 160, and/or other structures. The file system 150 may store many of these structures per metadata block, such that any one block may include metadata that applies to multiple version families. In alternative embodiments, metadata applying to different version families may be stored in respective sets of blocks, such that these sets of blocks may be included in the version families rather than in a separate overhead family.

In example operation, hosts 110(1-N) issue IO requests 112(1-N) to the data storage system 116. The SP 120 receives the IO requests 112(1-N) at the communication interfaces 122 and initiates further processing. Such processing may include, for example, performing reads and writes to files in version families of the file system 150.

At some point, the file system 150 receives a command 140 to perform an action that would affect storage requirements of one or more files in a version family. In various examples, the action specified by the command 140 may be to create or delete a data object in a version family, to create or delete a snap, or to convert a file in a version family from thin to thick, or vice versa. In some examples, the command 140 originates from outside the data storage system 116, e.g., from a host 110 or an administrative computer (not shown). In other examples, the command 140 originates from within the data storage system 116, e.g., from another software construct running on the SP 120, or even from within the file system manager 150a itself, e.g., in response to the file system 150 requiring one or more additional storage extents 172 or being able to return one or more provisioned storage extents 172a to the storage pool 170.

As is known, a "thick" file is a file that has a predetermined maximum size that is fully reserved. For example, the pool manager 170a may provide 10 GB of insurance 174 to support a 10 GB thick file, even if the file only uses a fraction of that space. In contrast, a "thin" file is not fully reserved. Rather, reserved space for a thin file grows in response to the file being written-to, e.g., on demand in response to IO requests 112 from hosts 110. In an example, the file system 150 includes metadata that identifies a file as being either thin or thick, e.g., using an attribute of an inode of the file. Based on the setting of that attribute, the file system manager 150a treats the file accordingly, e.g., by fully reserving space to accommodate a maximum predetermined size of the file if the file is designated as thick, and by not fully reserving such space if the file is designated as thin.

In response to receiving the command 140 that would affect storage requirements of a version family, the file system 150 generates a family liability value. The family liability value provides an estimate of storage space that would be required for that version family if the action were performed. For example, if the action specified by command 140 is to create a new thick object, the new object would require additional liability at least as large as the maximum predetermined size of that thick object.

In some examples, generating family liability involves determining space requirements for both file data and certain metadata (e.g., indirect blocks) specific to the version family. In further examples, overhead liability is also determined at this time, to account for metadata not specific to the particular version family but necessary to fully support the specified action.

Once family liability is generated (e.g., for data, for metadata, for both, and/or for the overhead family), the file system manager 150a sends an insurance request 152 to the pool manager 170a specifying the generated liability value or values. The pool manager 170a then checks for available space in the storage pool 170, accounting for existing reservations indicated by insurance 174. The pool manager 170a then issues an insurance reply 154. If the pool 170 has available storage space greater than or equal to the requested liability value(s), the insurance reply 154 grants the insurance request 152. The action specified by command 140 may then proceed. However, if the pool 170 does not have enough available storage to meet the request 152, the insurance request 152 is denied and the action specified by the command 140 does not proceed.

Data storage system 116 may generate new family liability values in response to newly arriving commands and may provide different family liability values for different families. Liability values are thus generated on a per-family basis. As will be described, generating liability in this way leverages relationships among family members and avoids greatly overestimating liability requirements in the file system 150.

Figure 2:
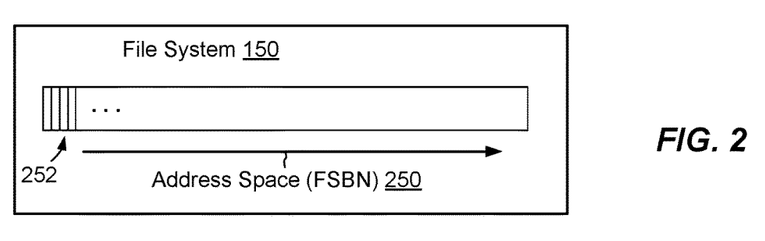
FIG. 2 is a block diagram of an example file system of FIG. 1.

FIG. 2 shows an example arrangement of file system 150 in additional detail. Here, it is seen that file system 150 has an address space 250, which ranges, for example, from zero to a large number. Each address in the address space 250 has an FSBN (File System Block Number) that uniquely identifies a respective block (see blocks 252). Some blocks 252 store file data while others store metadata. Some blocks 252 are shared among multiple files, whereas others are unique to a single file. Still other blocks 252 may be free, i.e., present within the address space 250 but not yet allocated to anything. Metadata stored in blocks within the file system address space 250 provides structure that defines files and version families in the file system 150.

Figure 3:
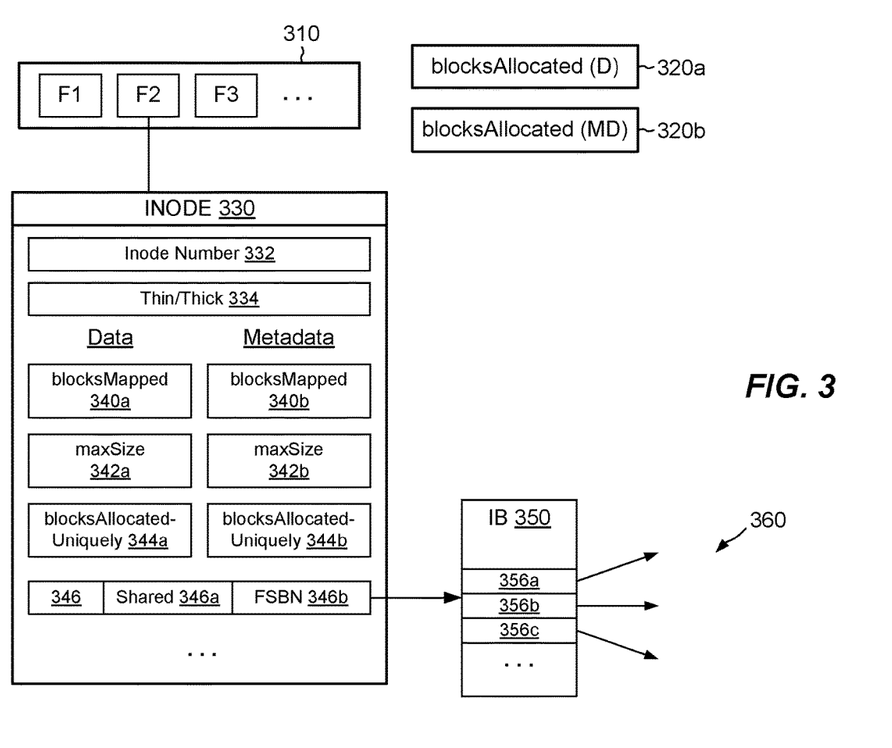
FIG. 3 is a block diagram of an example version family of FIG. 1, including example metadata structures.

FIG. 3 shows example metadata structures of file system 150. In an example, such metadata structures track information relevant to generating accurate family liability estimates.

As shown in FIG. 3, version family 310 includes multiple files, F1, F2, F3, and so on. Each file has an associated inode (index node), with inode 330 of file F2 shown in detail. Although the inode 330 relates particularly to file F2, it is intended to be representative of inodes of files in any version family.

Inode 330 stores attributes specific to the file F2, only some of which are shown. For example, inode number 332 uniquely identifies file F2 within the file system 150. Also, thin/thick attribute 334 specifies whether the file F2 is thin or thick. Some inode attributes are provided for both data and metadata (e.g., indirect blocks) of file F2, as described in the following table:

TABLE 1

| Term | Meaning for Data | Meaning for Metadata |
| --- | --- | --- |
| blocksMapped | 340a: Number of data blocks mapped by the file; excludes holes; relevant for thin files; maintained in write IO path; incremented for each write to a hole. | 340b: Number of indirect blocks allocated to support the file; maintained in write IO path; incremented for each indirect block mapped. |
| maxSize | 342a: Predetermined maximum file size in blocks; relevant for thick files; established at file creation. | 342b: Number of indirect blocks needed to support thick file at its maxSize (342a); calculated at file creation. |

TABLE 1-continued

| Term | Meaning for Data | Meaning for Metadata |
| --- | --- | --- |
| blocksAllocated-Uniquely | 344a: Lower bound on number of data blocks that are unique to this file; maintained in write IO path; incremented when writing to shared block or hole. | 344b: Lower bound on number of indirect blocks unique to file; maintained in write IO path; incremented when writing to shared indirect block or hole. |

The file system manager 150a increments the attributes 344a and 344b for blocksAllocatedUniquely each time a write is performed to a shared block or a hole in the file. For example, writing to a hole (i.e., a previously unmapped location) causes a new block to be allocated, which therefore is initially unique. Also, writing to a shared block induces a write split, which causes a new block to be allocated. The new block is unique and thus is counted by blocksAllocatedUniquely. In an example, however, it is assumed that the write split in response to writing the source file does not cause the block to become unique in the shared file (the file with which the block was shared), as it is likely that the shared block was also shared with multiple other files, such that the write split would not cause the block to become unique in the other files.

The inode 330 further includes one or more block pointers, which point either to data blocks or to indirect blocks in the file system address space 250. For example, block pointer 346 points to an IB (Indirect Block) 350. Each block pointer includes a shared attribute 346a, which indicates whether the block pointed-to by the block pointer 346 is shared or not, and an FSBN 346b of the pointed-to block. Here, FSBN 346b is the address of indirect block 350. A block pointer indicate a "hole" if its FSBN 346b is blank, null, or otherwise invalid.

IB 350 includes an array of block pointers (e.g., 356a, 356b, 356c, etc.), which may each be arranged identically to block pointer 346, for example. Each block pointer in the IB 350 may itself point to another IB or to a data block. IB's may thus be arranged in an IB tree 360, with leaf IBs of the IB tree 360 pointing to data blocks.

As further shown in FIG. 3, file system 150 includes version-family metadata for version family 310. Such version-sion-family metadata includes blocksAllocated 320a for data (D) and blocksAllocated 320b for metadata (MD). The blocksAllocated 320a for data maintains a count of all data blocks allocated to all files in the version family 310. Likewise, the blocksAllocated 320b for metadata maintains a count of all indirect blocks (IB's) allocated to support all files in the version family 310. In an example, the metadata structures 320a and 320b are updated in an IO write path, with writes induced by IO requests 112 (FIG. 1) monitored to count each data block and indirect block allocated to the version family 310.

Figure 4:
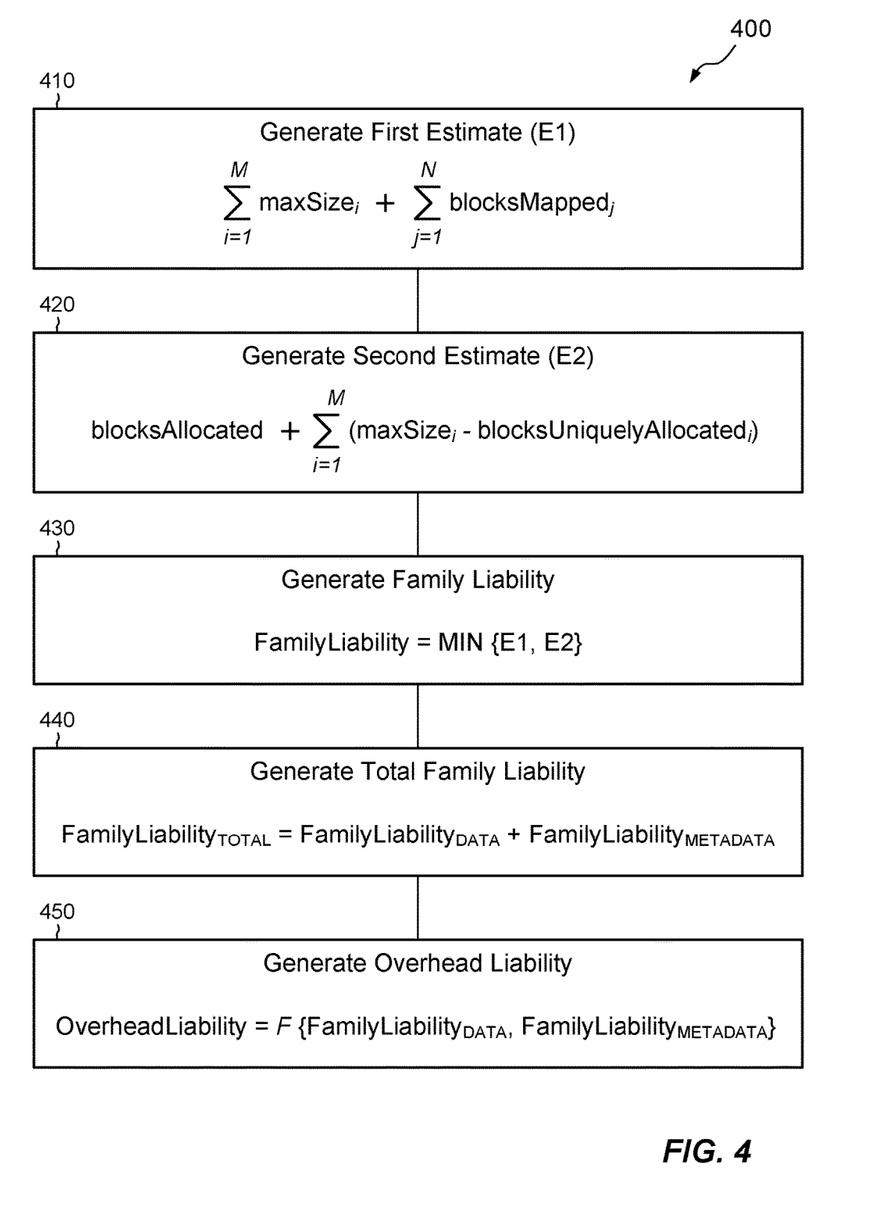
FIG. 4 is a flowchart showing an example method for generating liability.

FIG. 4 shows an example method 400 for generating liability values in file system 150. The method 400 may typically be carried out by the file system manager 150a, which runs in the memory 130 of SP 120.

Acts 410 and 420 generate first and second estimates (E1 and E2) for family liability, i.e., liability of a single version family. These acts may be performed in any order, or simultaneously.

Generating the estimate E1 at 410 involves producing a summation of maxSize (Table 1) over all thick files (1 to M) in the version family. Act 410 also involves producing a summation of blocksMapped (Table 1) over all thin files (1 to N) in the version family. The first estimate E1 is then provided as the sum of these summations. It can be seen from act 410 that the estimate E1 generates liability to fully reserve all thick files as well as all blocks mapped in all thin files. Estimate E1 may be an overestimate, however, as it fails to account for any blocks that may be shared. It should be appreciated that values for maxSize and blocksMapped may be obtained from the inodes of the files in question (see FIG. 3).

Generating the second estimate E2 at 420 involves adding the total blocks allocated in the version family, blocksAllocated, to a summation, over all thick files (1 to M) of the difference between the maximum predetermined size, maxSize, of each thick file and the number of blocksAllocatedUniquely in that thick file. The summation in 420 thus corresponds to the total number of shared blocks and holes in all thick files in the version family. Adding this summation to blocksAllocated yields estimate E2, which is often less than estimate E1, although not necessarily in all cases. It should be noted that maxSize and blocksAllocatedUniquely may be obtained from the inodes of the files in question, whereas blockAllocated may be obtained from version family metadata 320a and/or 320b. With estimates E1 and E2 established, act 430 generates family liability as the minimum of E1 and E2.

In an example, the acts 410, 420, and 430 are performed once for file data and again for file metadata (e.g., indirect blocks). For example, the file system manager 150a may generate family liability for data using values of blocksAllocated (D) 320a, blocksMapped 340a, maxSize 342a, and blocksAllocatedUniquely 344a. Likewise, the file system manager 150a may generate family liability for metadata using values of blocksAllocated (MD) 320b, blocksMapped 340b, maxSize 342b, and blocksAllocatedUniquely 344b.

In some examples, as shown in act 440, total family liability is generated as the sum of family liability for data and family liability for metadata. In other examples, family liability for data and metadata are kept separate.

At 450, the file system generates overhead liability for overhead family OF. In an example, the file system manager 150a calculates overhead liability as a function of family liability for data and family liability for metadata.

With liability values for data, metadata, and overhead thus established, the file system manager 150a may provide their sum in a single insurance request 152, for which a single insurance reply 154 is received (FIG. 1). Alternatively, the file system manager 150a may provide separate insurance requests, one for data, one for metadata, and one for overhead, and receive respective insurance replies, or may provide insurance requests in any combination.

It should be appreciated that counting all shared blocks in all thick files, as is done by the summation for estimate E2, can help to reduce overestimates of liability, as it accounts for the fact that thick files may share blocks with one another and/or with thin files. Estimate E2 thus leverages block-sharing relationships among files within a version family, in a way that could not be achieved readily without arranging files in version families, as block-sharing relationships among files would be much more difficult to account for when estimating liability.

It should further be appreciated that estimate E2 reserves space for existing thin files (e.g., snaps) by counting all blocksAllocated in the version family. Thus, not only does estimate E2 insure that all thick files (any number of them) are fully reserved, but also that all snaps (and other thin files) are reserved, at least to the extent of their current sizes. With this arrangement, it should never be necessary to invalidate snaps to meet space guarantees of thick files, as the estimate E2 results in enough insurance to support the existing thin files.

Estimate E1 also avoids the need to invalidate snaps, as it counts all mapped blocks in thin files as well as the maximum sizes of all thick files. Thus, estimate E1 counts all blocks allocated to snaps, whether the snaps are thin or thick.

It may be noted that the mere act of creating a snap of a file will generally result in an increase in estimate E2. Taking a snap will cause all blocks in the file from which the snap is taken to become shared, thus reducing blocksAllocatedUniquely for that file to zero and increasing the overall estimate. In an example, liability is generated upon each lifecycle event of an object or snap, such that reserved space is kept current with version families as they evolve.

Figure 5:
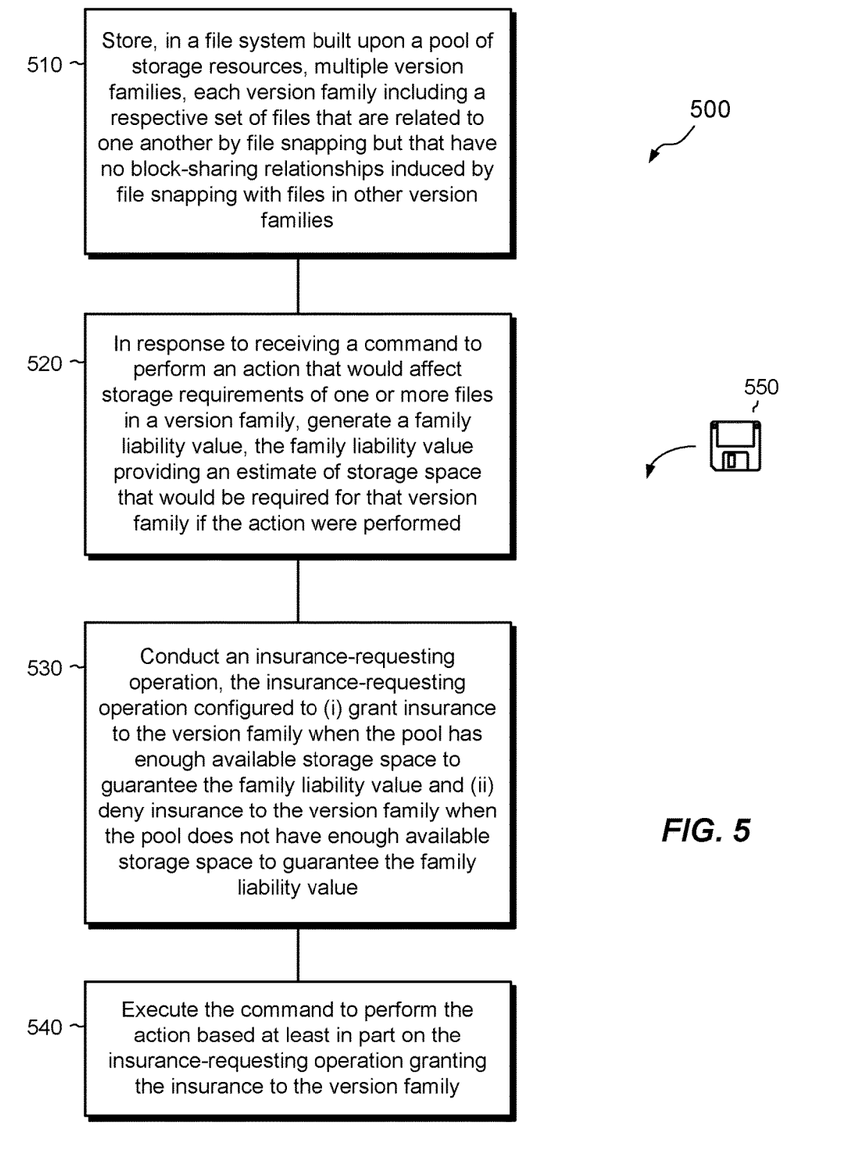
FIG. 5 is a flowchart showing an example method for managing storage space in a file system.

FIG. 5 shows an example method 500 for managing storage space in a data storage system. The method 500 may be carried out by the software constructs described in connection with FIG. 1. Also, the various acts of the method 500 may be ordered in any suitable way.

At 510, multiple version families (e.g., VF1, VF2, etc.; see FIG. 1) are stored in a file system 150 built upon a pool 170 of storage resources. Each version family includes a respective set of files (e.g., F1, F2, F3, etc.; see FIG. 2) that are related to one another by file snapping but that have no block-sharing relationships induced by file snapping with files in other version families.

At 520, in response to receiving a command 140 to perform an action that would affect storage requirements of one or more files in a version family, a family liability value is generated. The family liability value provides an estimate (see FIG. 4) of storage space that would be required for that version family if the action were performed.

At 530, an insurance-requesting operation is conducted. The insurance-requesting operation is configured to (i) grant insurance 154 to the version family when the pool 170 has enough available storage space to guarantee the family liability value (FIG. 4) and (ii) deny insurance to the version family when the pool 170 does not have enough available storage space to guarantee the family liability value.

At 540, the command 140 is executed to perform the action based at least in part on the insurance-requesting operation granting the insurance to the version family.

An improved technique has been described for managing storage space in a data storage system 116. The improved technique includes generating liability values on a per-family basis, rather than on a per-file system basis, with each family including files in the file system that are related to one another by snapping. The file system leverages the snap-based relationships among family members to produce more accurate estimates of liability than would otherwise be feasible.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing storage space in a data storage system, the method comprising:
    storing, in a file system built upon a pool of storage resources, multiple version families, each version family including a respective set of files that are related to one another by file snapping but that have no block-sharing relationships induced by file snapping with files in other version families;
    in response to receiving a command to perform an action that affects storage requirements of one or more files in a version family, generating a family liability value, the family liability value providing an estimate of storage space required for that version family if the action were performed;
    conducting an insurance-requesting operation, the insurance-requesting operation configured to (i) grant insurance to the version family when the pool has enough available storage space to guarantee the family liability value and (ii) deny insurance to the version family when the pool does not have enough available storage space to guarantee the family liability value; and
    executing the command to perform the action based at least in part on the insurance-requesting operation granting the insurance to the version family.

2. The method of claim 1, further comprising generating liability values for other version families in the file system, the liability value of the version family differing from the liability values of other version families in the file system.

3. The method of claim 2, wherein generating the family liability value of a version family includes providing, as the family liability value, a value not greater than a sum of (i) all blocks allocated to all files in the version family and (ii) a summation of all shared blocks and holes in all thick files, if any, in the version family, where in a thick file is a file having a predetermined maximum size in blocks, and wherein a hole in a thick file is an address within the predetermined maximum size of the thick file for which no block is allocated or shared.

4. The method of claim 3, further comprising maintaining, by the file system, a blocksAllocated metadata value that stores a count all blocks allocated to all files in the version family.

5. The method of claim 4, wherein maintaining the blocksAllocated metadata value includes monitoring a set of write operations to all files in the version family and incrementing the blocksAllocated value each time a new block is allocated during any of the set of write operations.

6. The method of claim 4, wherein each file in the version family has an inode in the file system, wherein the version family has at least one thick file, and wherein the method further comprises tracking, in the inode of each thick file in the version family, an attribute indicating a lower bound of a number of blocks allocated uniquely (blocksAllocatedUniquely) to that thick file.

7. The method of claim 6, further comprising incrementing the blocksAllocatedUniquely attribute in the inode of each thick file in the version family in response to a write operation directed to a shared block or hole in that thick file.

8. The method of claim 7, wherein generating the family liability value of a version family further includes providing, as the family liability value, a value not greater than a sum of (i) a summation across all thick files in the version family of all predetermined maximum sizes of those thick files and (ii) a summation across all thin files, if any, in the version family of all mapped blocks in those thin files, wherein a thin file is a file that is identified as thin in the file system and that is not fully space-guaranteed to any predetermined maximum size.

9. The method of claim 8, wherein the inode of each file in the version family stores an attribute designating whether that file is thick or thin.

10. The method of claim 2, wherein generating the family liability value of a version family includes providing, as the family liability value, a minimum of:
    (A) a sum of (i) a summation across all thick files in the version family of all predetermined maximum sizes of those thick files and (ii) a summation across all thin files, if any, in the version family of all mapped blocks in those thin files; and
    (B) a sum of (i) all blocks allocated to all files in the version family and (ii) a summation of all shared blocks and holes in all thick files, if any, in the version family,
    wherein a thick file is a file that is identified as thick in the file system and that is fully space-guaranteed to a predetermined maximum size in blocks,
    wherein a thin file is a file that is identified as thin in the file system and that is not fully space-guaranteed to any predetermined maximum size, and
    wherein a hole in a thick file is an address within the predetermined maximum size of the thick file for which no block is allocated or shared.

11. The method of claim 10, further comprising generating an overhead liability value for an overhead family in the file system, the overhead family including metadata structures shared by the version families but not specific to any one version family.

12. The method of claim 11, further comprising generating a family metadata liability, the family metadata liability indicating a number of indirect blocks required to support storage of file data represented by the family liability.

13. The method of claim 12, where each of the files in the version family is a container file that provides a complete realization of one of (i) a LUN (Logical UNit), (ii) a file system, or (iii) a virtual machine disk.

14. A data storage system, comprising control circuitry that includes a set of processing units coupled to memory, the control circuitry constructed and arranged to:
   store, in a file system built upon a pool of storage resources, multiple version families, each version family including a respective set of files that are related to one another by file snapping but that have no block-sharing relationships induced by file snapping with files in other version families;
   in response to receiving a command to perform an action that affects storage requirements of one or more files in a version family, generate a family liability value, the family liability value providing an estimate of storage space required for that version family if the action were performed;
   conduct an insurance-requesting operation, the insurance-requesting operation configured to (i) grant insurance to the version family when the pool has enough available storage space to guarantee the family liability value and (ii) deny insurance to the version family when the pool does not have enough available storage space to guarantee the family liability value; and
   execute the command to perform the action based at least in part on the insurance-requesting operation granting the insurance to the version family.

15. A computer program product including a set of non-transitory, computer-readable media having instructions which, when executed by control circuitry of a data storage system, cause the control circuitry to perform a method for managing storage space in a data storage system, the method comprising:
   storing, in a file system built upon a pool of storage resources, multiple version families, each version family including a respective set of files that are related to one another by file snapping but that have no block-sharing relationships induced by file snapping with files in other version families;
   in response to receiving a command to perform an action that affects storage requirements of one or more files in a version family, generating a family liability value, the family liability value providing an estimate of storage space required for that version family if the action were performed;
   conducting an insurance-requesting operation, the insurance-requesting operation configured to (i) grant insurance to the version family when the pool has enough available storage space to guarantee the family liability value and (ii) deny insurance to the version family when the pool does not have enough available storage space to guarantee the family liability value; and
   executing the command to perform the action based at least in part on the insurance-requesting operation granting the insurance to the version family.

16. The computer program product of claim 15, wherein generating the family liability value of a version family includes providing, as the family liability value, a value not greater than a sum of (i) all blocks allocated to all files in the version family and (ii) a summation of all shared blocks and holes in all thick files, if any, in the version family, where in a thick file is a file having a predetermined maximum size in blocks, and wherein a hole in a thick file is an address within the predetermined maximum size of the thick file for which no block is allocated or shared.

17. The computer program product of claim 16, further comprising maintaining, by the file system, a blocksAllocated metadata value that stores a count all blocks allocated to all files in the version family.

18. The computer program product of claim 17, wherein maintaining the blocksAllocated metadata value includes monitoring a set of write operations to all files in the version family and incrementing the blocksAllocated value each time a new block is allocated during any of the set of write operations.

19. The computer program product of claim 18, wherein each file in the version family has an inode in the file system, wherein the version family has at least one thick file, and wherein the method further comprises tracking, in the inode of each thick file in the version family, an attribute indicating a lower bound of a number of blocks allocated uniquely (blocksAllocatedUniquely) to that thick file.

20. The computer program product of claim 19, wherein the method further comprises incrementing the blocksAllocatedUniquely attribute in the inode of each thick file in the version family in response to a write operation directed to a shared block or hole in that thick file.

* * * * *